United States Patent
Gill et al.

(10) Patent No.: US 9,189,220 B2
(45) Date of Patent: Nov. 17, 2015

(54) EVALUATING APPLICATION COMPATIBILITY

(75) Inventors: Sunbir Gill, Irvine, CA (US); Krishna K. Rajagopalan, Irvine, CA (US); Matthew A. Jones, Ladera Ranch, CA (US); Kenneth Chung Kay Ko, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 56 days.

(21) Appl. No.: 13/540,045

(22) Filed: Jul. 2, 2012

(65) Prior Publication Data

US 2014/0007057 A1  Jan. 2, 2014

(51) Int. Cl.
*G06F 9/445* (2006.01)

(52) U.S. Cl.
CPC *G06F 8/61* (2013.01); *G06F 9/445* (2013.01); *G06F 9/44505* (2013.01); *G06F 9/44589* (2013.01)

(58) Field of Classification Search
USPC .......... 455/404.1, 414.1, 456.3; 705/27.1, 37; 707/5, 632, 770, 792, 3; 709/203; 711/133; 717/174, 170, 172, 127; 715/735
See application file for complete search history.

(56) References Cited

U.S. PATENT DOCUMENTS

| | | | |
|---|---|---|---|
| 6,615,253 B1 | 9/2003 | Bowman-Amuah | |
| 7,143,241 B2* | 11/2006 | Hull | 711/133 |
| 8,595,186 B1* | 11/2013 | Mandyam et al. | 707/632 |
| 2004/0034853 A1* | 2/2004 | Gibbons et al. | 717/174 |
| 2006/0074880 A1* | 4/2006 | Bukary | 707/3 |
| 2006/0129638 A1* | 6/2006 | Deakin | 709/203 |
| 2006/0149782 A1* | 7/2006 | Yeh et al. | 707/103 X |
| 2007/0061243 A1* | 3/2007 | Ramer et al. | 705/37 |
| 2009/0037287 A1* | 2/2009 | Baitalmal et al. | 705/26 |
| 2009/0106738 A1* | 4/2009 | Battisha et al. | 717/127 |
| 2009/0193019 A1* | 7/2009 | Hassan et al. | 707/5 |
| 2009/0233623 A1* | 9/2009 | Johnson | 455/456.3 |
| 2010/0069035 A1* | 3/2010 | Johnson | 455/404.1 |
| 2010/0185727 A1* | 7/2010 | Mittal | 709/203 |
| 2010/0233996 A1* | 9/2010 | Herz et al. | 455/411 |
| 2010/0262619 A1* | 10/2010 | Zargahi et al. | 707/770 |
| 2011/0029881 A1* | 2/2011 | Smith et al. | 715/735 |
| 2011/0173235 A1* | 7/2011 | Aman et al. | 707/792 |
| 2011/0320307 A1* | 12/2011 | Mehta et al. | 705/26.7 |
| 2011/0321029 A1 | 12/2011 | Kern et al. | |
| 2012/0129503 A1* | 5/2012 | Lindeman et al. | 455/414.1 |
| 2012/0158732 A1 | 6/2012 | Mital et al. | |

(Continued)

OTHER PUBLICATIONS

Butler, Mark H., "Using capability classes to classify and match CC/PP And UAProf profiles", 2002, Hewlett-Packard Company.*

(Continued)

*Primary Examiner* — Qing Wu
*Assistant Examiner* — Gilles Kepnang
(74) *Attorney, Agent, or Firm* — Thomas | Horstemeyer, LLP

(57) ABSTRACT

Disclosed are various embodiments for evaluating application compatibility with computing devices. A set of applications is determined and then filtered to exclude those applications which are incompatible with a particular client. The filtering is performed by determining a capability set for the client and performing an evaluation of a compatibility expression for each application using the capability set to determine whether each application is compatible with the client. The filtered set of applications is returned and may be used in user interfaces associated with an application marketplace system.

26 Claims, 7 Drawing Sheets

(56) References Cited

U.S. PATENT DOCUMENTS

| | | | |
|---|---|---|---|
| 2012/0233605 A1* | 9/2012 | Lupu et al. | 717/172 |
| 2012/0246291 A1* | 9/2012 | Wong et al. | 709/224 |
| 2013/0024851 A1* | 1/2013 | Firman et al. | 717/170 |
| 2013/0166417 A1* | 6/2013 | Pulkowski et al. | 705/27.1 |
| 2013/0167135 A1* | 6/2013 | Neumann et al. | 717/174 |

OTHER PUBLICATIONS

Pillaj, Premshree, "Postfix Evaluation", 2002, Retrieved from the following website: "http://scriptasylum.com/tutorials/infix_postfix/algorithms/postfix-evaluation/".*

International Search Report for PCT/US13/48852 filed Jul. 1, 2013.

* cited by examiner

EVALUATING APPLICATION COMPATIBILITY

BACKGROUND

Many different types of mobile devices are available, from smartphones with small display screens and limited feature sets to tablet computers with large display screens and extensive feature sets. Applications written for one type of mobile device may not be compatible with another type of mobile device. As an example, an application that takes photos may be incompatible with mobile devices which lack cameras. As another example, an application may have a user interface designed for a certain minimum display resolution and may be incompatible with mobile devices having a display resolution below the minimum.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to evaluating application compatibility. An application marketplace typically includes numerous applications which may or may not be compatible with any given device. When a customer browses or executes a search in an application marketplace, it is desirable to avoid presenting incompatible applications to the customer. For example, excluding incompatible applications from a user interface for the application marketplace reduces clutter. In addition, excluding incompatible applications prevents a poor customer experience resulting from accidental installation or execution of incompatible applications.

Various embodiments of the present disclosure provide approaches to evaluating the compatibility of one or more applications with a client, which may be used to filter or exclude incompatible applications from a user interface for an application marketplace. To this end, compatibility expressions may be automatically constructed for an application in response to the application being added to the application marketplace. Client capability data for clients may be obtained. When the customer browses or searches the application marketplace for applications to install on a client, the results are filtered to exclude applications which are incompatible with the client. The filtering is performed based at least in part on an evaluation of the compatibility expressions for the applications with respect to the client capability data for the client. The incompatible applications may then be excluded from selection by the customer, or may even excluded from being surfaced to the customer. In the following discussion, a general description of the system and its components is provided, followed by a discussion of the operation of the same.

Figure 1:
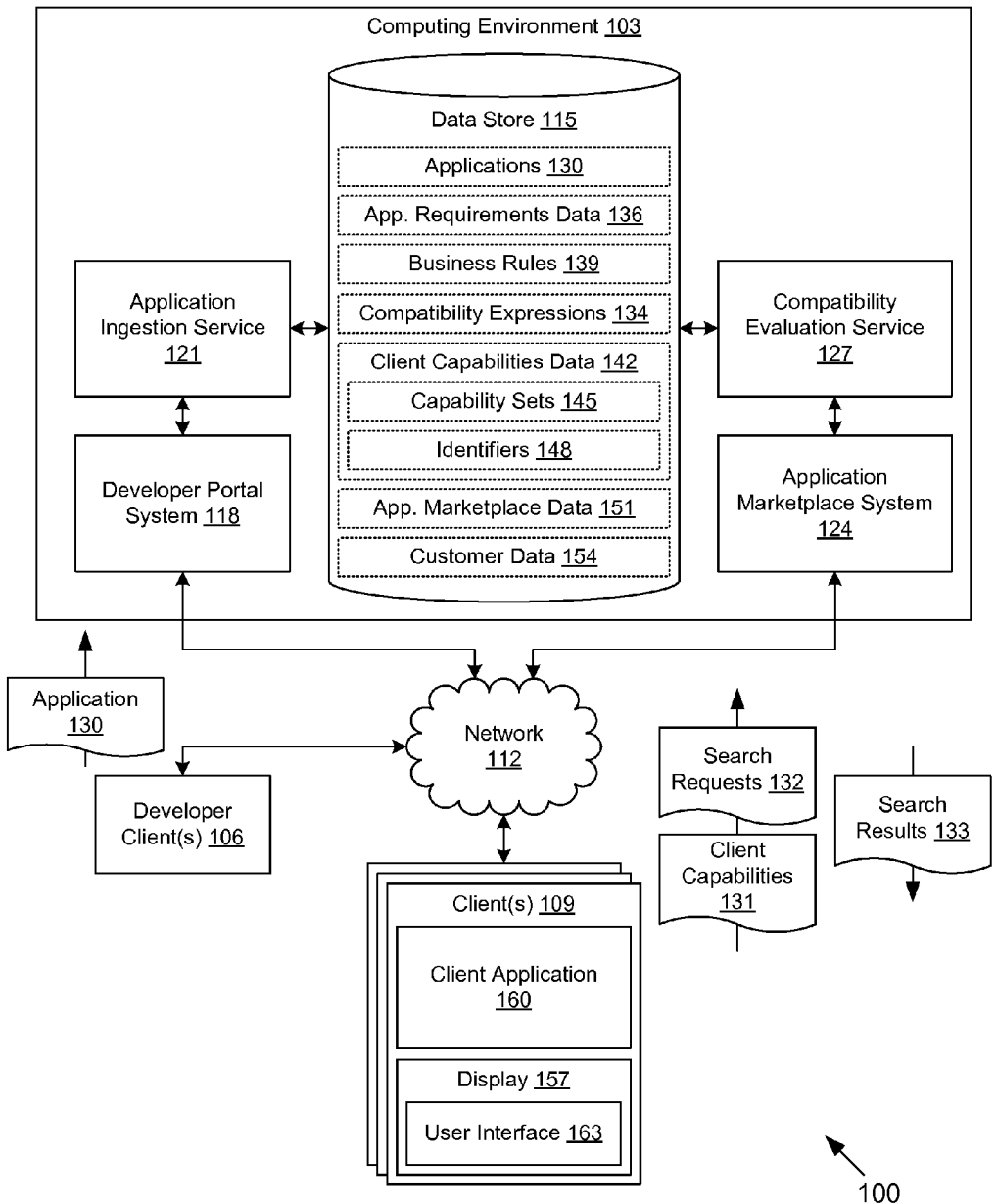
FIG. 1 is a drawing of a networked environment according to various embodiments of the present disclosure.

With reference to FIG. 1, shown is a networked environment 100 according to various embodiments. The networked environment 100 includes a computing environment 103 in data communication with one or more developer clients 106 and one or more clients 109 by way of a network 112. The network 112 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, a plurality of computing devices may be employed in the computing environment 103 that are arranged, for example, in one or more server banks or computer banks or other arrangements. For example, a plurality of computing devices together may comprise a cloud computing resource, a grid computing resource, and/or any other distributed computing arrangement. Such computing devices may be located in a single installation or may be distributed among many different geographical locations.

Various applications and/or other functionality may be executed in the computing environment 103 according to various embodiments. Also, various data is stored in a data store 115 that is accessible to the computing environment 103. The data store 115 may be representative of a plurality of data stores 115 as can be appreciated. The data stored in the data store 115, for example, is associated with the operation of the various applications and/or functional entities described below.

The components executed on the computing environment 103, for example, include a developer portal system 118, an application ingestion service 121, an application marketplace system 124, a compatibility evaluation service 127, and other applications, services, processes, systems, engines, or functionality not discussed in detail herein. The developer portal system 118 is executed to generate user interfaces and perform functionality related to maintaining the presence of a developer in an application marketplace. A developer, as used herein, may correspond to a user or business entity corresponding to a source or distributor of an application 130. The developer portal system 118 may allow a developer at a developer client 106 to submit or upload applications 130, establish pricing for applications 130, establish metadata for applications 130, customize merchandising for the applications 130 in the application marketplace, and/or perform other functions.

Once a developer provides an application 130 to the developer portal system 118, the application ingestion service 121 may be executed to add the application 130 to the application marketplace. The application ingestion service 121 may perform various tasks relating to configuring the application marketplace to offer the application 130. For example, the application ingestion service 121 may determine various requirements of the application 130 such as supported operating systems, supported display resolutions or sizes, supported wireless carriers, processor requirements, memory requirements, and so on.

The application marketplace system 124 is executed to provide user interfaces and perform various backend functionality relating to an application marketplace. An application marketplace facilitates user acquisition of applications 130 to be installed on clients 109. The applications 130 may be provided by many different developers. Such acquisition may include purchases and downloads, free downloads, trial downloads, upgrades, unlocking, and/or other types of acquisitions. The application marketplace system 124 facilitates user searching of available applications 130 and/or browsing of applications 130 according to genre, category, title, release date, and so on. The application marketplace system 124 may perform user authentication and charging of various payment instruments, such as credit cards, electronic checks, lines of credit, gift cards, etc. to facilitate electronic payment for applications 130.

The application marketplace system 124 is configured to obtain registrations of client capabilities 131 and search requests 132 from clients 109. In response to search requests 132, the application marketplace system 124 is configured to return search results 133 to the clients 109 over the network 112. In some embodiments, the search results 133 may be pre-filtered to exclude incompatible applications 130. In other embodiments, the search results 133 may be provided to the client 109 for compatibility filtering to be performed in the client 109. Although the search results 133 may be generated in response to search queries, the search results 133 may also be generated in response to search requests 132 for category listings, popular applications 130 listings, and/or other predefined or dynamically generated listings of applications 130.

The application marketplace system 124, the developer portal system 118, or both may comprise commercially available hypertext transfer protocol (HTTP) server applications such as Apache® HTTP Server, Apache® Tomcat®, Microsoft® Internet Information Services (IIS), and/or other servers. The application marketplace system 124, the developer portal system 118, or both may employ HTTP, simple object access protocol (SOAP), representational state transfer (REST), and/or other networking protocols.

The compatibility evaluation service 127 is executed to evaluate whether a particular application 130 is compatible or incompatible with a particular set of capabilities for a client 109. To this end, the compatibility evaluation service 127 may perform variable substitution into a compatibility expression 134 generated for a particular application 130. In one embodiment, the compatibility expression 134 corresponds to a postfix expression which is evaluated by the compatibility evaluation service 127 using a stack.

The data stored in the data store 115 includes, for example, applications 130, application requirements data 136, business rules 139, compatibility expressions 134, client capabilities data 142 with capability sets 145 and identifiers 148, application marketplace data 151, customer data 154, and potentially other data. The applications 130 in the data store 115 correspond to those applications 130 which have been provided by developers for inclusion in the application marketplace. The applications 130 may include, for example, mobile applications, hypertext markup language 5 (HTML5) applications, desktop applications and/or other applications.

The application requirements data 136 includes the various application requirements for each of the applications 130. Such requirements may include security requirements, feature requirements, and/or other requirements for the clients 109 to meet before an application 130 may be downloaded and/or installed onto the clients 109. Such requirements may be determined from a manifest or other file included in the application 130. Additionally, such requirements may be ascertained by way of analyzing the code of the application 130, executing the code of the application 130 and determining which features are accessed, and/or by other approaches. In some cases, the requirements may be manually specified by a developer at the developer client 106 through a user interface generated by the developer portal system 118.

The business rules 139 may include arbitrary rules that may determine whether applications 130 are compatible with specific capability sets 145. For business reasons, either on behalf of the proprietor of the application marketplace or the developer, it may be desirable not to offer certain applications 130 for acquisition and installation on certain clients 109. As a non-limiting example, if the proprietor of the application marketplace offers mapping applications 130 for certain tablet clients 109, the business rules 139 may specify that mapping applications 130 from other sources are not compatible with the tablet clients 109. As another example, a business rule 139 may specify that certain applications 130 are incompatible with mobile clients 109 associated with wireless carriers other than a particular exclusive wireless carrier.

The compatibility expressions 134 may be generated by the application ingestion service 121 from the application requirements data 136 and the business rules 139 which pertain to an application 130. In one embodiment, the compatibility expressions 134 correspond to a listing of terms comprising operands and operators. The operands may include variables and constants. The operators may include, for example, logical operators, comparison operators, arithmetic operators, set operators, and so on. In some cases, an operator may be associated with a predetermined number of operators, e.g., two operands or another number. The compatibility expressions 134 may be provided in prefix, infix, or postfix notation. In one embodiment, the compatibility expressions 134 may be in postfix notation for stack-based evaluation.

The client capabilities data 142 includes data that describes the capabilities or characteristics associated with various clients 109. Such capabilities or characteristics may determine whether an application 130 is compatible with the corresponding clients 109. The client capabilities data 142 includes multiple capability sets 145, where each capability set 145 may correspond to multiple clients 109 having the same capabilities. Each capability set 145 may specify, for example, an operating system version, a wireless carrier, installed applications 130 and libraries, whether the client 109 has a global positioning system (GPS) device, whether the client 109 has a camera, the processor of the client 109, the memory of the client 109, and so on. Each capability set 145 is associated with an identifier 148 which identifies the capability set 145.

The application marketplace data 151 includes various data associated with the application marketplace provided by the application marketplace system 124. For example, the application marketplace data 151 may include pricing information, order information, metadata for applications 130, information pages, category and taxonomy structures, reviews, ratings, screenshots, and/or other data that may be employed in merchandising applications 130. The customer data 154 may include various data regarding users of the application marketplace system 124. Such data may include security credentials, browsing history, order history, identifiers 148 for registered devices, and/or other information.

The developer client 106 is representative of a plurality of client devices operated by developers that may be coupled to the network 112. The developer client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The developer client 106 may be configured to execute various applications such as a browser and/or other applications. The browser may be executed in a developer client 106, for example, to access and render network pages, such as web pages, or other network content served up by the developer portal system 118 and/or other servers, thereby generating a rendered network page on a display. The developer client 106 may be configured to execute applications beyond a browser, such as, for example, mobile applications, email applications, instant message applications, and/or other applications.

The client 109 is representative of a plurality of client devices operated by customers or prospective customers that may be coupled to the network 112. The client 109 may comprise, for example, a processor-based system such as a computer system. Such a computer system may be embodied in the form of a desktop computer, a laptop computer, a mobile computer, personal digital assistants, cellular telephones, smartphones, set-top boxes, music players, web pads, tablet computer systems, game consoles, electronic book readers, or other devices with like capability. The client 109 may include a display 157. The display 157 may comprise, for example, one or more devices such as liquid crystal display (LCD) screens, gas plasma-based flat panel displays, LCD projectors, or other types of display devices, etc.

The client 109 may be configured to execute various applications such as a client application 160 and/or other applications. The client application 160 is configured to render a user interface 163 on the display 157 to facilitate browsing and searching the application marketplace and purchasing, downloading, and installing applications 130 from the application marketplace. In one embodiment, the client application 160 corresponds to a mobile application for the application marketplace. In another embodiment, the client application 160 corresponds to a browser employed, for example, to access and render network pages, such as web pages, or other network content served up by the application marketplace system 124 and/or other servers. The client 109 may be configured to execute applications beyond client application 160 such as, for example, mobile applications, email applications, instant message applications, and/or other applications.

Next, a general description of the operation of the various components of the networked environment 100 is provided. To begin, a developer at a developer client 106 interacts with the developer portal system 118 to submit one or more applications 130 to be included in the application marketplace. In some cases, multiple versions of an application 130 may be submitted. Also, as new versions of the application 130 are released, the new versions may be submitted. The new versions may, for example, coexist with or replace previous versions. The applications 130 may be uploaded to the developer portal system 118, or the developer portal system 118 may be configured to download the applications 130 from another source. Other approaches to submission of applications 130 may be employed in other embodiments.

The application ingestion service 121 then processes each application 130 that has been submitted for inclusion in the application marketplace. To this end, the application ingestion service 121 may determine the various requirements of the application 130. Such requirements may be manually specified by the developer and/or automatically determined. For example, the application ingestion service 121 may launch the application 130 and determine which resources that the application 130 attempts to access. Alternatively, or additionally, the application ingestion service 121 may inspect the code of the application 130 to assess what features, resources, etc. are used by the application 130. Further, the application ingestion service 121 may determine requirements based at least in part on a manifest or other configuration file for the application 130, if present. The application ingestion service 121 then creates a compatibility expression 134 for the application 130 from the application requirements data 136 and any applicable business rules 139.

Separately, customers may establish accounts and/or identities with the application marketplace system 124. As part of this process, each of the customers may register one or more clients 109 with the application marketplace system 124. A customer may download and install the client application 160 to facilitate this registration process. Alternatively, where the client application 160 is a browser, the customer may browse to a network site served up by the application marketplace system 124. The network site may then load various client-executable code onto the browser that performs the registration process.

As part of registration, the client application 160 may interrogate the client 109 to ascertain the various capabilities of the client 109. For example, the client application 160 may determine the current operating system version, software libraries that are installed, whether a GPS device is present, whether a camera is present, the current wireless carrier, and/or other characteristics, features, etc. of the client 109. Although the discussion herein primarily relates the capabilities to the client 109 device, the capabilities may additionally or alternatively relate to the client application 160. As a non-limiting example, where the client application 160 is a browser, it may be determined whether the client application 160 supports HTML5, what HTML5 features are supported, and so on.

The client application 160 then reports the client capabilities 131 to the application marketplace system 124. After initial registration, the client application 160 may be configured to interrogate the client 109 and report the client capabilities 131 periodically (e.g., monthly, bimonthly, etc.), in response to a capability change, upon accessing the application marketplace system 124, and/or at other times. The application marketplace system 124 then matches the client capabilities 131 with a pre-existing capability set 145, if one exists. If one does not exist, the application marketplace system 124 may create a new capability set 145 in the data store 115 from the client capabilities 131 and assign a new identifier 148 to it. The identifier 148 associated with the applicable capability set 145 may then be associated with the client 109 in the customer data 154, stored on the client 109 as a cookie, transferred to the client 109 for use by the client application 160, or otherwise associated with the client 109.

A customer may then access various user interfaces 163 of the application marketplace through the client application 160. Data may be sent over the network 112 between the client application 160 and the application marketplace system 124 to facilitate generating and rendering of the user interfaces 163. In one embodiment, the user interfaces 163 may correspond to rendered web pages. In another embodiment, the user interfaces 163 may correspond to mobile application screens. Through the user interfaces 163, the customer may browse and/or search through the applications 130 offered by the application marketplace. The customer may enter a search query and/or access a user interface 163 configured to present certain applications 130. In doing so, the client application 160 may send a search request 132 to the application marketplace system 124.

In response, the application marketplace system 124 obtains a list of applications 130, for example, by executing a search using the search query or retrieving a predefined list. The applications 130 in the list, although perhaps meeting criteria for popularity, freshness, relevance to the search query, price, etc., may or may not be compatible with the client 109. According to various embodiments, filtering is performed to exclude applications 130 (and/or versions of applications 130) which are incompatible with the client 109.

In one embodiment, the filtering is performed server-side by the application marketplace system 124. To this end, the application marketplace system 124 may query the compatibility evaluation service 127 to determine whether each application 130 in the list of applications 130 is compatible with the client 109. Each query may provide an identifier 148 for the capability set 145 of the client 109, along with a corresponding identifier for the respective application 130. Where the queries are transmitted as service calls over a network, the application marketplace system 124 may be configured to batch the queries or service calls to minimize the impact of network latency. The filtered list of applications 130, or at least a portion thereof, is then sent to the client 109 by way of the network 112.

In another embodiment, the filtering is performed client-side by the client 109. In other words, a list of applications 130 that may include incompatible applications 130 is sent to the client 109 in the search results 133. The client application 160 then may make one or more service calls to the compatibility evaluation service 127 to determine whether each of the applications 130 is compatible with the client 109. In such service calls, the client application 160 may pass the identifier 148 (or information that may be used to determine the identifier 148) along with the corresponding identifier for each application 130. The client application 160 may be configured to batch the queries or service calls to minimize the impact of network latency. The results of the evaluations may be cached in the client 109 in one embodiment.

When the filtered list of applications 130, or at least a portion thereof, is available at the client 109, the client application 160 renders a user interface 163 presenting one or more applications 130 from the list of applications 130 that are compatible. The user interface 163 may include one or more links or other user interface components for navigating to detail pages or screens for the applications 130. Additionally, the user interface 163 may include one or more links or other user interface components for initiating an acquisition of one of the applications 130 (e.g., purchase and download, free download, upgrade of an existing installation, etc.).

In some cases, the search request 132 and/or the evaluation queries to the compatibility evaluation service 127 may provide various mutable capability characteristics associated with the client 109. For example, in one embodiment, the stored capability sets 145 may include immutable characteristics for the client 109, while mutable characteristics may be supplied by the client 109 to enable the filtering. Such mutable capability characteristics may include, for example, the current operating system version, the current wireless carrier, and so on.

Although functionality has been described regarding the capability of the client 109 initiating the search request 132 for applications 130 to be installed on the client 109, in other embodiments a search request 132 may specify an identifier 148 associated with a different client 109. For instance, customers may wish to browse mobile applications 130 which are compatible with their smartphones from their desktop computer. In such a case, customers may manually identify or select from previously registered devices, thereby selecting an identifier 148 which differs from that of the client 109 being used.

The compatibility evaluation service 127 obtains queries specifying an identifier of an application 130, an identifier 148 of a capability set 145, as well as potentially a version identifier of the application 130 and mutable capability characteristics, and performs an evaluation to determine whether the application 130 is compatible with the capability set 145. To this end, the compatibility evaluation service 127 obtains a compatibility expression 134 corresponding to the application 130 (and version, if applicable) and substitutes variables in the compatibility expression 134 according to the values in the capability set 145 (and mutable capability characteristics, if applicable). The compatibility evaluation service 127 may also perform translation of the compatibility expression 134 from infix to postfix notation and/or other translations if applicable. In one embodiment, the compatibility evaluation service 127 evaluates the compatibility expression 134 using a stack. The result of the evaluation indicates whether the application 130 is compatible or incompatible with the given capability set 145 (and mutable capability characteristics, if applicable). The result may be cached in the data store 115 and utilized in lieu of a future request to the compatibility evaluation service 127 if desired.

Figure 2:
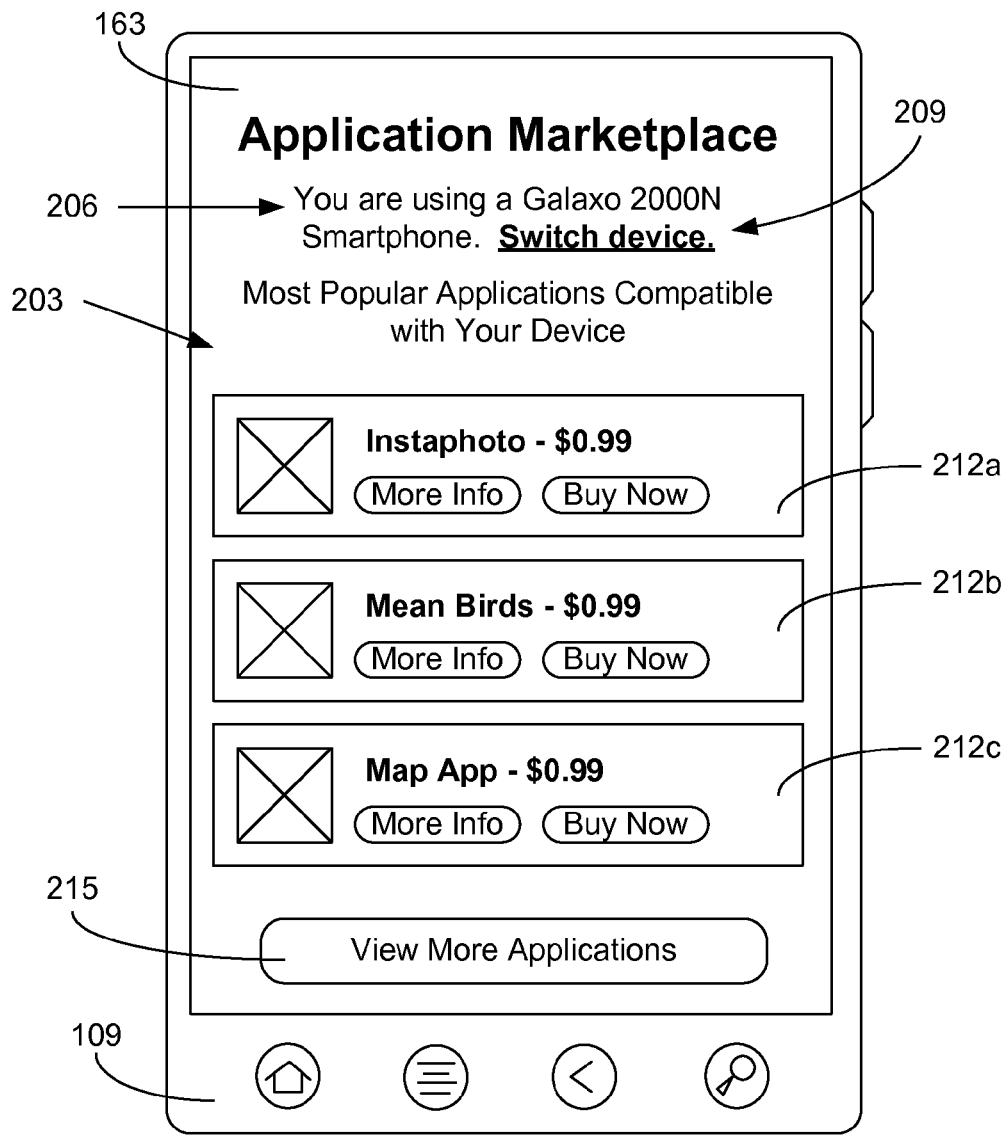
FIG. 2 is a drawing of an example of a user interface rendered by a client in the networked environment of FIG. 1 according to various embodiments of the present disclosure.

Turning now to FIG. 2, shown is one example of a user interface 163 rendered by a client application 160 (FIG. 1) executed in the client 109 in the networked environment 100 (FIG. 1) according to various embodiments. The user interface 163 presents a list 203 of applications 130 (FIG. 1) which are determined to be compatible with the client 109. An identification 206 of the client 109 describes the client 109 as being a "Galaxo 2000N Smartphone." A user interface component 209 may be provided to switch the client 109 that is being evaluated for compatibility. For example, the customer may have registered a tablet computer previously and may wish to browse on the smartphone for applications 130 which are compatible with the tablet computer.

The list 203 includes descriptions 212a, 212b, and 212c of three applications 130, corresponding respectively to "Instaphoto," "Mean Birds," and "Map App." In this non-limiting example, a graphic, a component for requesting more information, and a component for requesting a purchase may be provided for each description 212. Because the size of the user interface 163 may be limited, one or more navigation components 215 may be provided to update the user interface 163 to render descriptions 212 for additional applications 130 in the list 203.

Figure 3:
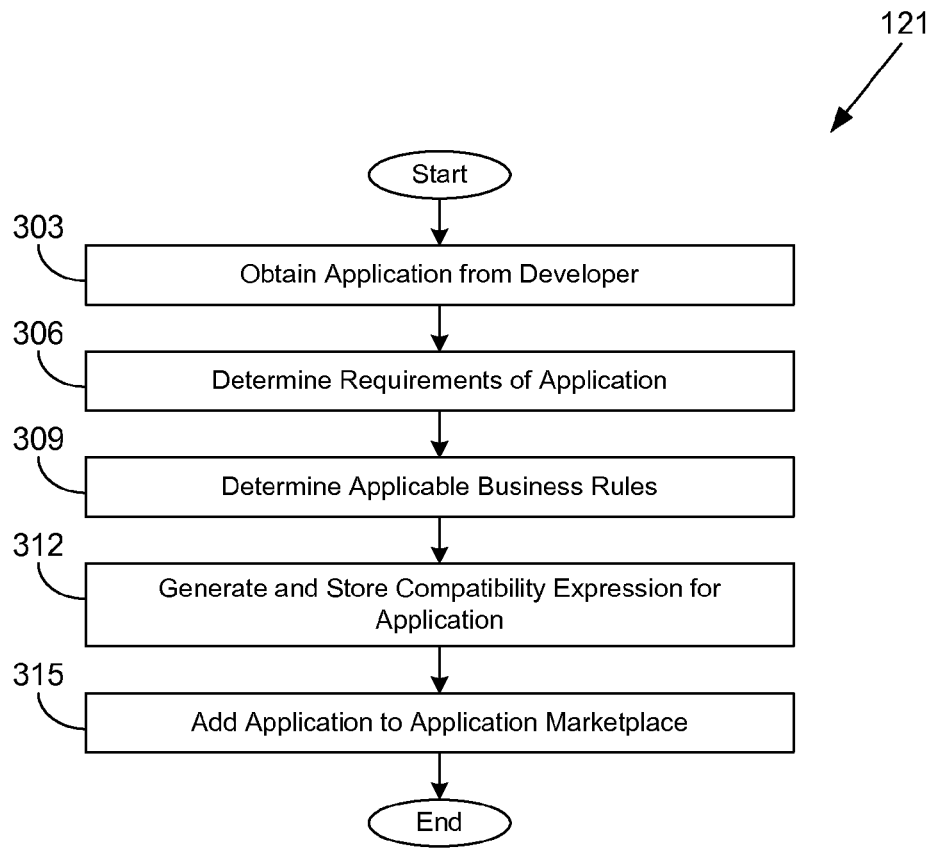
FIG. 3 is a flowchart illustrating one example of functionality implemented as portions of an application ingestion service executed in a computing environment of FIG. 1 according to various embodiments of the present disclosure.

Referring next to FIG. 3, shown is a flowchart that provides one example of the operation of a portion of the application ingestion service 121 according to various embodiments. It is understood that the flowchart of FIG. 3 provides merely an example of the many different types of functional arrangements that may be employed to implement the operation of the portion of the application ingestion service 121 as described herein. As an alternative, the flowchart of FIG. 3 may be viewed as depicting an example of steps of a method implemented in the computing environment 103 (FIG. 1) according to one or more embodiments.

Beginning with box 303, the application ingestion service 121 obtains an application 130 (FIG. 1) from a developer. For example, the developer may submit the application 130 through the developer portal system 118 (FIG. 1). In box 306, the application ingestion service 121 determines the requirements of the application 130. For example, the application ingestion service 121 may examine data associated with the application 130 (e.g., a manifest, etc.). Also, the application ingestion service 121 may inspect the code of the application 130 or execute the code of the application 130 to determine what features the application 130 uses. Additionally, the application ingestion service 121 may obtain requirements that have been manually specified by the developer. The application ingestion service 121 may store the requirements in the application requirements data 136 (FIG. 1).

In box 309, the application ingestion service 121 determines business rules 139 (FIG. 1) which may apply to the application 130. In box 312, the application ingestion service 121 generates a compatibility expression 134 (FIG. 1) for the application 130. The application ingestion service 121 then stores the compatibility expression 134 in the data store 115 (FIG. 1). In box 315, the application ingestion service 121 adds the application 130 to the application marketplace, which may involve storing the application 130 in the data store 115, updating the application marketplace data 151 (FIG. 1), registering the application 130 with the application marketplace system 124 (FIG. 1), and/or other actions. Thereafter, the portion of the application ingestion service 121 ends.

Figure 4:
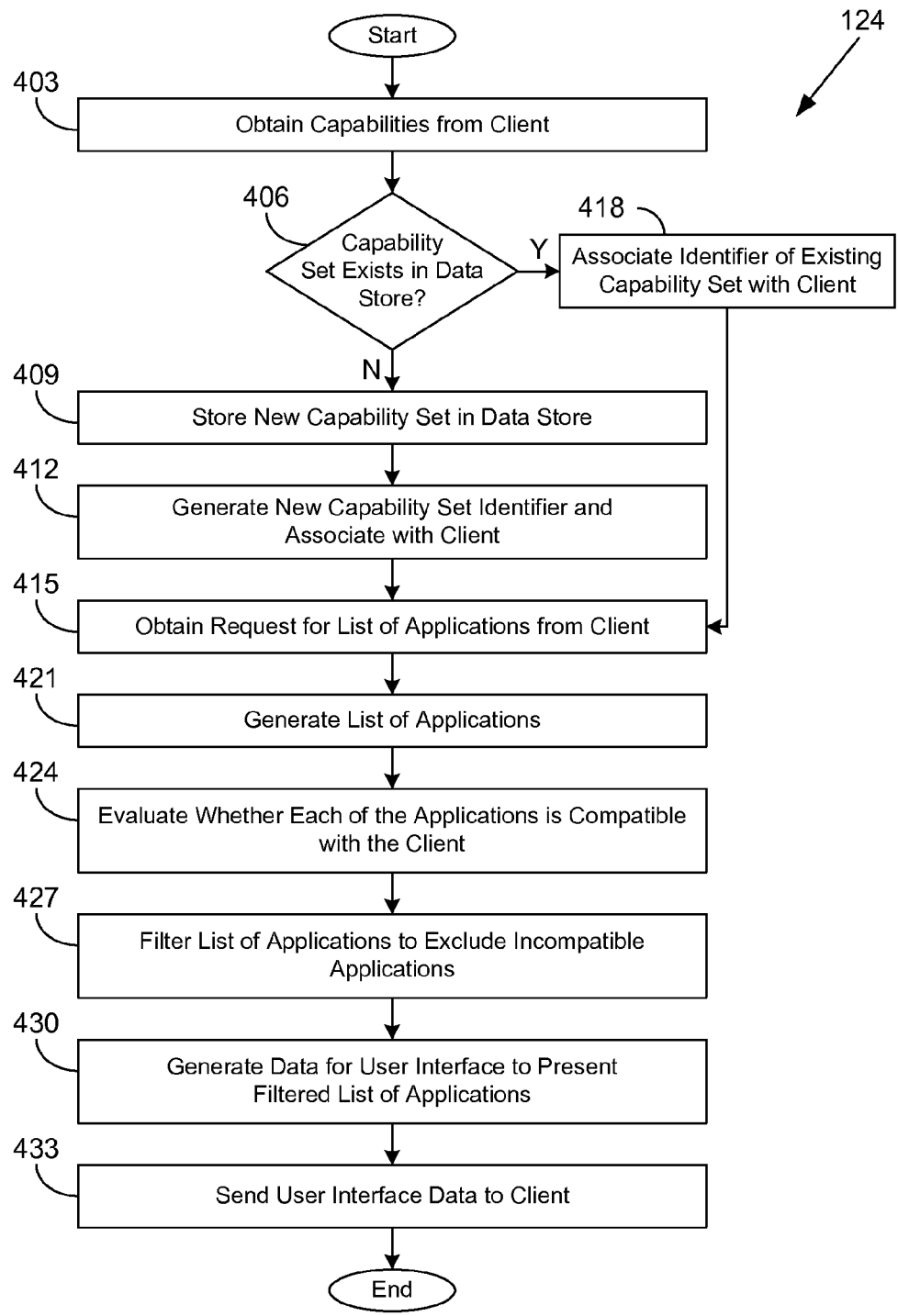
FIG. 4 is a flowchart illustrating one example of functionality implemented as portions of an application marketplace system executed in a computing environment of FIG. 1 according to various embodiments of the present disclosure.

Moving on to FIG. 4, shown is a flowchart that provides one example of the operation of a portion of the application marketplace system 124 according to various embodiments. It is understood that the flowchart of FIG. 4 provides merely an example of the many different types of functional arrangements that may be employed to implement the operation of the portion of the application marketplace system 124 as described herein. As an alternative, the flowchart of FIG. 4 may be viewed as depicting an example of steps of a method implemented in the computing environment 103 (FIG. 1) according to one or more embodiments.

Beginning with box 403, the application marketplace system 124 obtains client capabilities 131 (FIG. 1) from a client 109 (FIG. 1). In box 406, the application marketplace system 124 determines whether a corresponding capability set 145 (FIG. 1) exists in the data store 115 (FIG. 1). If a corresponding capability set does not exist, the application marketplace system 124 moves to box 409 and stores a new capability set 145 corresponding to the client capabilities 131 in the data store 115. In box 412, the application marketplace system 124 generates a new identifier 148 (FIG. 1) for the capability set 145 and associates the identifier 148 with the client 109. To this end, the application marketplace system 124 may update the customer data 154 (FIG. 1), send the identifier 148 to the client 109, store the identifier 148 as a cookie on the client 109, and/or perform other actions. The application marketplace system 124 then proceeds to box 415.

If, instead, the application marketplace system 124 determines that capability set 145 already exists in the data store 115, the application marketplace system 124 moves from box 406 to box 418 and associates an identifier 148 of an existing capability set 145 with the client 109. To this end, the application marketplace system 124 may update the customer data 154, send the identifier 148 to the client 109, store the identifier 148 as a cookie on the client 109, and/or perform other actions. The application marketplace system 124 then proceeds to box 415.

In box 415, the application marketplace system 124 obtains a request for a list of applications 130 (FIG. 1) from the client 109. For example, the request may be a search request 132 (FIG. 1), a request for a category listing, etc. In box 421, the application marketplace system 124 generates the list of applications 130. For example, the application marketplace system 124 may execute a search on the applications 130 to find applications 130 matching search criteria. In box 424, the application marketplace system 124 queries the compatibility evaluation service 127 (FIG. 1) to determine whether each of the applications 130 is compatible with the client 109. In some cases, the application marketplace system 124 may batch queries together to avoid latency effects in the communication between the application marketplace system 124 and the compatibility evaluation service 127.

In box 427, the application marketplace system 124 filters the list of applications 130 to exclude applications 130 which are determined to be incompatible. In box 430, the application marketplace system 124 generates data for a user interface 163 (FIG. 1) to present the filtered list of applications 130. In box 433, the application marketplace system 124 sends the data for the user interface 163 to the client 109 over the network 112 (FIG. 1). Thereafter, the portion of the application marketplace system 124 ends.

Figure 5:
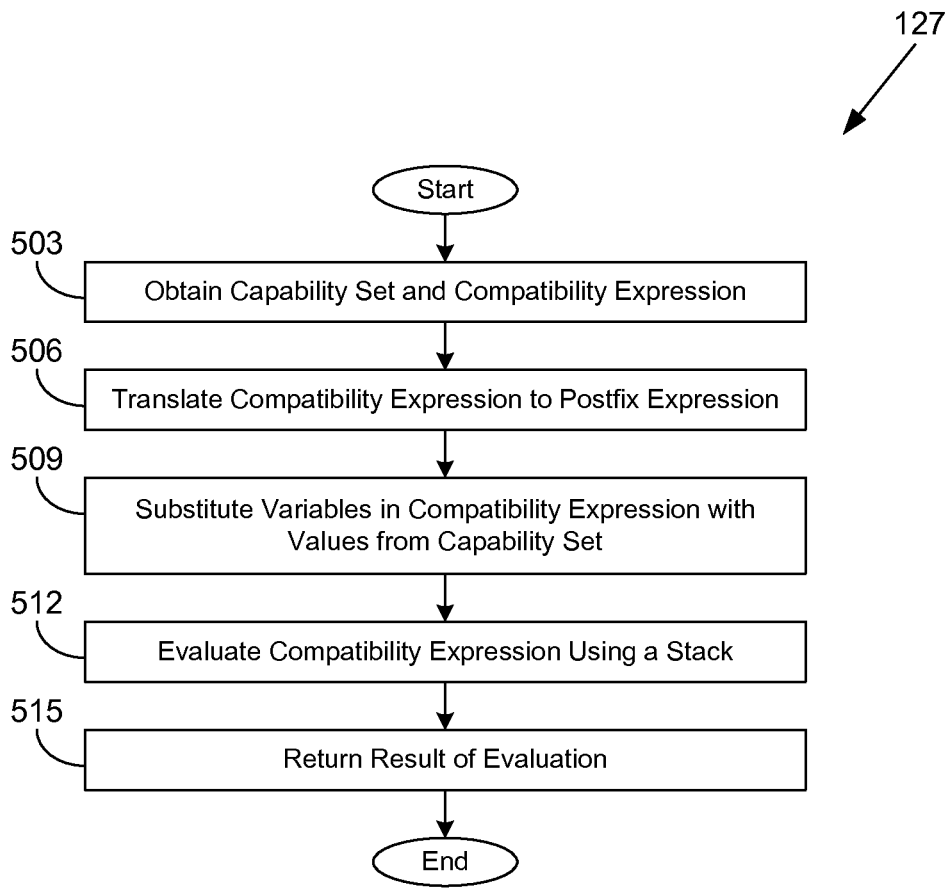
FIGS. 5 and 6 are flowcharts illustrating examples of functionality implemented as portions of a compatibility evaluation service executed in a computing environment of FIG. 1 according to various embodiments of the present disclosure.

Continuing on to FIG. 5, shown is a flowchart that provides one example of the operation of a portion of the compatibility evaluation service 127 according to various embodiments. It is understood that the flowchart of FIG. 5 provides merely an example of the many different types of functional arrangements that may be employed to implement the operation of the portion of the compatibility evaluation service 127 as described herein. As an alternative, the flowchart of FIG. 5 may be viewed as depicting an example of steps of a method implemented in the computing environment 103 (FIG. 1) according to one or more embodiments.

Beginning with box 503, the compatibility evaluation service 127 obtains a capability set 145 (FIG. 1) corresponding to a client 109 (FIG. 1) and a compatibility expression 134 (FIG. 1) corresponding to an application 130 (FIG. 1). In some cases, the compatibility evaluation service 127 may also obtain a version identifier for the application 130 to identify the compatibility expression 134. Further, the compatibility evaluation service 127 may also obtain various mutable capability characteristics for the client 109 in addition to what is stored in the capability set 145.

In box 506, the compatibility evaluation service 127 translates the compatibility expression 134 to a postfix expression, if applicable. In box 509, the compatibility evaluation service 127 substitutes variables in the compatibility expression 134 with values from the capability set 145. For example, the compatibility expression 134 may have a variable "screenSize," and the capability set 145 may have the attribute-value pair of "screenSize=small." Thus, the compatibility evaluation service 127 may substitute "screenSize" with "small" for purposes of evaluating the compatibility expression 134.

Figure 6:
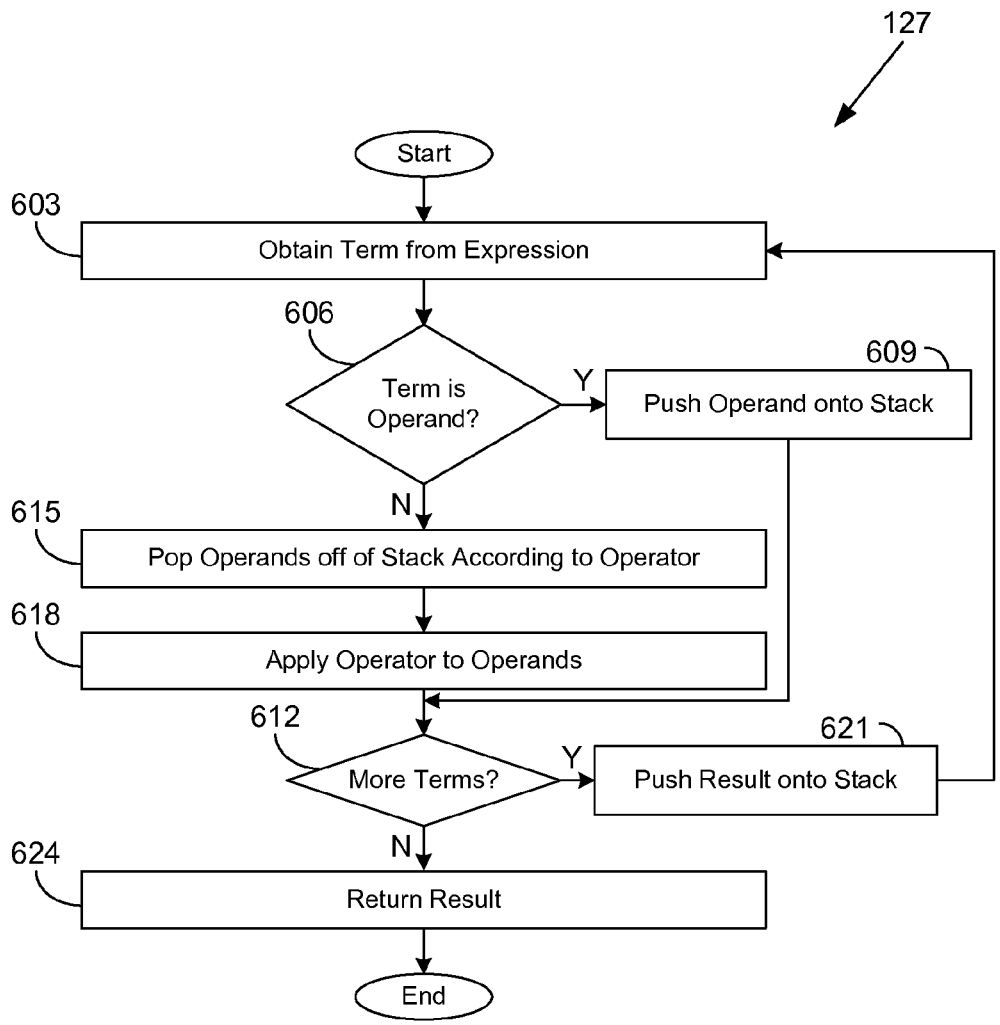

In box 512, the compatibility evaluation service 127 evaluates the compatibility expression using a stack, which is described further in connection with the flowchart of FIG. 6. In box 515, the compatibility evaluation service 127 returns the result of the evaluation. Thereafter, the portion of the compatibility evaluation service 127 ends.

Turning now to FIG. 6, shown is a flowchart that provides one example of the operation of another portion of the compatibility evaluation service 127 according to various embodiments. It is understood that the flowchart of FIG. 6 provides merely an example of the many different types of functional arrangements that may be employed to implement the operation of the other portion of the compatibility evaluation service 127 as described herein. As an alternative, the flowchart of FIG. 6 may be viewed as depicting an example of steps of a method implemented in the computing environment 103 (FIG. 1) according to one or more embodiments.

Beginning with box 603, the compatibility evaluation service 127 obtains a term from a compatibility expression 134. In box 606, the compatibility evaluation service 127 determines whether the term is an operand. If the compatibility evaluation service 127 determines that the term is an operand, the compatibility evaluation service 127 proceeds to box 609 and pushes the operand onto the stack. The compatibility evaluation service 127 then continues to box 612.

If, instead, the compatibility evaluation service 127 determines that the term is not an operand (i.e., is an operator), the compatibility evaluation service 127 moves from box 606 to box 615 and pops operands off of the stack according to the operator. For example, the compatibility evaluation service 127 may pop a number of operands off of the stack, where the number may be determined based at least in part on the operator. In box 618, the compatibility evaluation service 127 applies the operator to the operands. For example, where the operator is "=" and the operands are "6" and "7," the compatibility evaluation service 127 may evaluate whether "6" equals "7," thereby producing a result of false.

In box 612, the compatibility evaluation service 127 determines whether the compatibility expression 134 includes more terms. If the compatibility expression 134 includes more terms, the compatibility evaluation service 127 pushes the operator result onto the stack in box 621 and thereafter returns to box 603. If the compatibility expression 134 does not include more terms, the compatibility evaluation service 127 returns the result in box 624. Thereafter, the portion of the compatibility evaluation service 127 ends.

Figure 7:
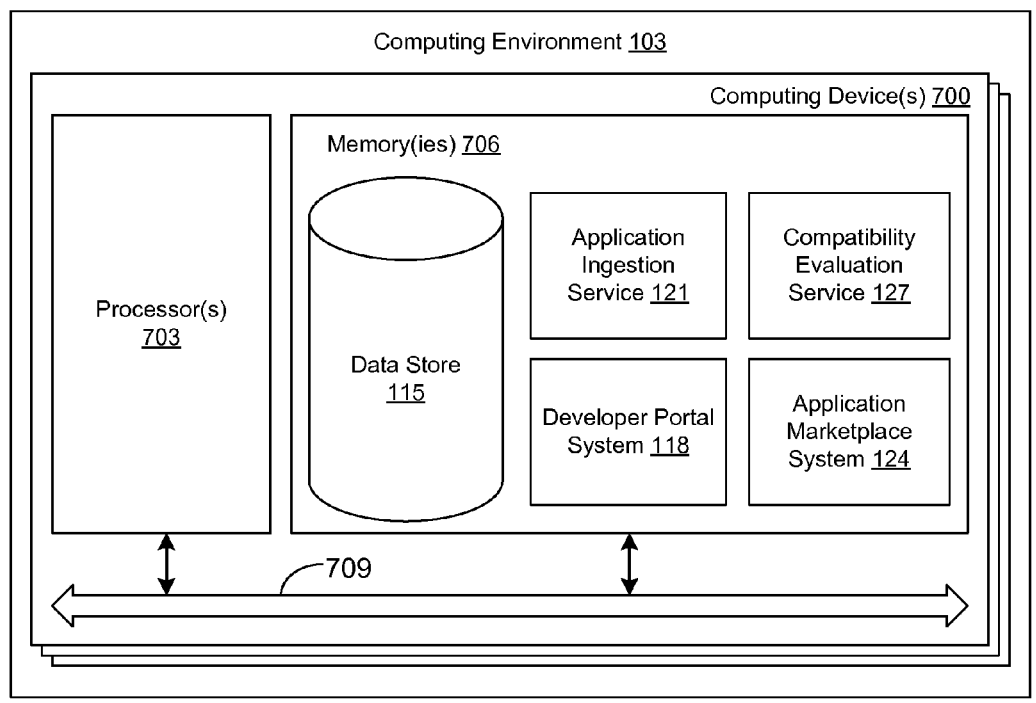
FIG. 7 is a schematic block diagram that provides one example illustration of a computing environment employed in the networked environment of FIG. 1 according to various embodiments of the present disclosure.

With reference to FIG. 7, shown is a schematic block diagram of the computing environment 103 according to an embodiment of the present disclosure. The computing environment 103 includes one or more computing devices 700. Each computing device 700 includes at least one processor circuit, for example, having a processor 703 and a memory 706, both of which are coupled to a local interface 709. To this end, the computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the developer portal system 118, the application ingestion service 121, the application marketplace system 124, the compatibility evaluation service 127, and potentially other applications. Also stored in the memory 706 may be a data store 115 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the developer portal system 118, the application ingestion service 121, the application marketplace system 124, the compatibility evaluation service 127, the client application 160 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3-6 show the functionality and operation of an implementation of portions of the application ingestion service 121, the application marketplace system 124, and the compatibility evaluation service 127. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 3-6 show a specific order of execution, it is understood that the order of execution may differ from that which is depicted. For example, the order of execution of two or more blocks may be scrambled relative to the order shown. Also, two or more blocks shown in succession in FIGS. 3-6 may be executed concurrently or with partial concurrence. Further, in some embodiments, one or more of the blocks shown in FIGS. 3-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the developer portal system 118, the application ingestion service 121, the application marketplace system 124, the compatibility evaluation service 127, and the client application 160, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, comprising:
   code that obtains a set of mobile applications from a developer;
   code that determines whether individual applications of the set of mobile applications are compatible with a mobile device according to respective evaluation results, configured to:
      obtain a set of capabilities associated with the mobile device;
      obtain a corresponding compatibility expression for the individual applications of the set of mobile applications, the compatibility expression comprising at least one term in a postfix expression; and
      send a single batch containing a plurality of evaluation requests to a compatibility evaluation service over a network, wherein each individual evaluation request of the single batch of evaluation requests specifies a corresponding identifier for a respective one of the set of mobile applications and an identifier for the set of capabilities, the compatibility evaluation service being configured to:
         access a plurality of attribute-value pairs belonging to the set of capabilities;
         substitute a respective value from an individual attribute-value pair of the plurality of attribute-value pairs for an individual variable of a plurality of operands in the corresponding compatibility expression, wherein the corresponding compatibility expression further comprises an operand associated with either the respective value or the individual variable; and
         perform an evaluation of the corresponding compatibility expression, based, at least in part, on the set of capabilities to produce a respective evaluation result, the evaluation comprising:
            determining whether the at least one term is an operator or an operand;
            pushing the operand onto a stack in response to determining that the at least one term is an operand;
            popping a number of operands from the stack in response to determining that the at least one term is an operator; and
            pushing a result onto the stack;
   code that caches the result and utilizes the cached result, in lieu of a future batch of new evaluation requests;
   code that filters the set of mobile applications to exclude mobile applications that are incompatible with the mobile device; and
   code that generates a user interface that facilitates an acquisition of the mobile application by a user for installation on the mobile device.

2. The non-transitory computer-readable medium of claim 1, wherein the code that is configured to obtain the set of capabilities is further configured to load the set of capabilities from a data store according to an identifier for set of capabilities.

3. The non-transitory computer-readable medium of claim 1, wherein the evaluation result is based, at least in part, on the mobile device being associated with a particular wireless carrier, wherein the individual applications of the set of mobile applications are not compatible when the mobile device is associated with a wireless carrier other than the particular wireless carrier.

4. The non-transitory computer-readable medium of claim 1, wherein the code that obtains a set of mobile applications from a developer further comprises code that sends a request including a search query that, when executed, produces the set of mobile applications.

5. The non-transitory computer-readable medium of claim 1, further comprising code that caches the set of applications that has been filtered.

6. The non-transitory computer-readable medium of claim 5, further comprising code that generates another user interface configured to present at least one application from the set of applications that has been cached.

7. The non-transitory computer-readable medium of claim 1, wherein the code that obtains the corresponding compatibility expression is configured to obtain the corresponding compatibility expression based, at least in part, on a plurality of business rules.

8. A system, comprising:
at least one computing device; and
at least one application executable in the at least one computing device, the at least one application comprising:
logic that determines whether individual applications of a set of applications are compatible with a particular client according to respective evaluation results, configured to:
determine a capability set for the particular client;
obtain a corresponding compatibility expression for the individual applications of the set of applications, the corresponding compatibility expression comprising a plurality of terms in a postfix expression; and
send a single batch containing a plurality of evaluation requests to a compatibility evaluation service over a network, wherein each individual evaluation request of the single batch of evaluation requests specifies a corresponding identifier for a respective one of the set of applications and an identifier for the capability set, the compatibility evaluation service being configured to:
access a plurality of attribute-value pairs belonging to the capability set;
substitute a respective value from an individual attribute-value pair of the plurality of attribute-value pairs for an individual variable of a plurality of operands in the corresponding compatibility expression, wherein the corresponding compatibility expression further comprises an operand associated with either the respective value or the individual variable; and
perform an evaluation of the corresponding compatibility expression, based, at least in part, on the capability set to produce a respective evaluation result, the evaluation comprising:
determining whether a term of the plurality of terms is an operand or an operator;
pushing the operand onto a stack in response to determining that the term is an operand;
popping a number of operands from the stack in response to determining that the term is an operator; and
pushing a result onto the stack;
logic that caches the result and utilizes the cached result, in lieu of a future batch of new evaluation requests;

logic that filters the set of applications to exclude applications that are incompatible with the particular client; and
logic that returns the set of applications that has been filtered.

9. The system of claim 8, wherein the at least one application further comprises logic that generates a user interface to facilitate a purchase of any of the set of applications that has been filtered, the applications that are incompatible with the particular client being excluded from selection through the user interface.

10. The system of claim 9, wherein the applications that are incompatible with the particular client are excluded from being surfaced in the user interface.

11. The system of claim 9, wherein the at least one application further comprises logic that generates another user interface configured to present at least one application of the set of applications that has been cached.

12. The system of claim 8, wherein the set of applications corresponds to a set of mobile applications and the client corresponds to a mobile device.

13. The system of claim 8, wherein the at least one application further comprises:
logic that obtains a developer-provided application;
logic that automatically determines a plurality of application requirements for the developer-provided application;
logic that automatically generates the corresponding compatibility expression for the developer-provided application based, at least in part, on the application requirements; and
logic that stores the corresponding compatibility expression in association with the developer-provided application.

14. The system of claim 13, wherein the logic that automatically generates the corresponding compatibility expression is configured to generate the corresponding compatibility expression based, at least in part, on a plurality of business rules.

15. The system of claim 8, wherein the at least one application further comprises:
logic that obtains the capability set from the particular client;
logic that determines whether the capability set matches any stored capability set in a data store;
logic that stores the capability set in the data store in response to determining that the capability set does not match any stored capability set in the data store; and
logic that associates the identifier for the capability set with the particular client.

16. The system of claim 8, wherein the at least one application further comprises logic that obtains a search query from a user, and the logic that determines the set of applications is configured to determine the set of applications based at least in part on executing the search query.

17. The system of claim 8, wherein the evaluation further includes substituting a respective constant from the capability set for individual ones of a plurality of operand variables in the corresponding compatibility expression.

18. The system of claim 8, wherein the evaluation of the corresponding compatibility expression further comprises:
for individual terms of the plurality of terms in the postfix expression:
generating a result by applying the operator to the number of operands; and
pushing the result onto the stack.

19. A method, comprising:

obtaining, in a client computing device, a set of capabilities associated with the client computing device;

obtaining, in the client computing device, a list of applications from an application marketplace system;

determining, in the client computing device, whether individual applications of the list of applications are compatible with the client computing device according to respective evaluation results, the determining comprising:

obtaining, in the client computing device, a corresponding compatibility expression for the individual applications of the list of applications, the corresponding compatibility expression comprising a plurality of terms in a postfix expression;

sending, in the client computing device, a single batch containing a plurality of evaluation requests to a compatibility evaluation service over a network, wherein each individual evaluation request of the single batch of evaluation requests specifies a corresponding identifier for a respective one of the list of applications and an identifier for the set of capabilities, the compatibility evaluation service being configured to:

access a plurality of attribute-value pairs belonging to the set of capabilities;

substitute a respective value from an individual attribute-value pair of the plurality of attribute-value pairs for an individual variable of a plurality of operands in the corresponding compatibility expression, wherein the corresponding compatibility expression further comprises an operand associated with either the respective value or the individual variable; and perform an evaluation of the corresponding capability expression, based, at least in part, on the set of capabilities to produce a respective evaluation result, the evaluation comprising:

determining whether a term in the plurality of terms is an operand or an operator;

pushing the operand onto a stack in response to determining that the term is an operand;

popping a number of operands from the stack in response to determining that the term is an operator; and pushing a result onto the stack;

caching, in the client computing device, the result and utilizing the cached result, in lieu of a future batch of new evaluation requests;

filtering, in the client computing device, the list of applications to exclude applications that are incompatible with the client computing device; and rendering, in the client computing device, a user interface configured to present the list of applications that has been filtered.

20. The method of claim 19, wherein the request further includes at least one mutable capability characteristic of the client computing device.

21. The method of claim 20, wherein the at least one mutable capability characteristic includes an operating system version.

22. The method of claim 20, wherein the at least one mutable capability characteristic includes a current wireless carrier for the client computing device.

23. The method of claim 19, further comprising:

periodically discovering, in the client computing device, the set of capabilities for the client computing device; and registering, in the client computing device, the set of capabilities that has been discovered with the application marketplace system.

24. The method of claim 19, wherein the user interface is configured to facilitate an acquisition of any of the list of applications for installation on the client computing device.

25. The method of claim 19, wherein the request includes a search query that, when executed in the application marketplace system, produces the list of applications.

26. The method of claim 19, further comprising:

caching, in the client computing device, the list of applications that has been filtered; and rendering, in the client computing device, another user interface configured to present at least one application from the list of applications that has been cached.

\* \* \* \* \*